United States Patent
Bradbeer

(10) Patent No.: US 8,521,019 B2
(45) Date of Patent: Aug. 27, 2013

(54) METHOD AND SYSTEM FOR CLOSED LOOP CONTROL OF AN OPTICAL LINK

(75) Inventor: Peter F. Bradbeer, Taplow (GB)

(73) Assignee: Nanotech Semiconductor Ltd. (GB)

( * ) Notice: Subject to any disclaimer, the term of this patent is extended or adjusted under 35 U.S.C. 154(b) by 995 days.

(21) Appl. No.: 12/218,502

(22) Filed: Jul. 14, 2008

(65) Prior Publication Data

US 2010/0008662 A1 Jan. 14, 2010

(51) Int. Cl.
*H04B 10/00* (2013.01)
(52) U.S. Cl.
USPC ......... 398/25; 398/59; 372/38.09; 372/38.07
(58) Field of Classification Search
USPC ............... 398/162, 140, 25, 59; 372/38.09, 372/38.07
See application file for complete search history.

(56) References Cited

U.S. PATENT DOCUMENTS

| | | | | |
|---|---|---|---|---|
| 5,450,229 A | * | 9/1995 | Wiesenfeld | 359/238 |
| 5,673,282 A | * | 9/1997 | Wurst | 372/38.09 |
| 7,203,213 B2 | * | 4/2007 | Anderson et al. | 372/38.07 |
| 7,443,896 B2 | * | 10/2008 | Fischer et al. | 372/38.02 |
| 7,630,632 B2 | * | 12/2009 | Dolfi | 398/22 |
| 7,724,792 B2 | * | 5/2010 | Neron et al. | 372/38.02 |
| 2004/0184802 A1 | * | 9/2004 | Xu | 398/27 |
| 2005/0265717 A1 | * | 12/2005 | Zhou | 398/9 |
| 2006/0098699 A1 | * | 5/2006 | Sanchez | 372/26 |
| 2006/0227885 A1 | * | 10/2006 | Thesling | 375/259 |
| 2008/0279566 A1 | * | 11/2008 | Miller et al. | 398/162 |
| 2010/0008662 A1 | * | 1/2010 | Bradbeer | 398/25 |
| 2010/0119225 A1 | * | 5/2010 | Snawerdt | 398/25 |

\* cited by examiner

*Primary Examiner* — Danny Leung
(74) *Attorney, Agent, or Firm* — Jones Day

(57) ABSTRACT

A method of closed loop control for an optical link is presented, utilizing a copper feedback connection between the optical transmitter and optical receiver, suitable for short distance applications. An architecture is provides that may be used to define and maintain an optimum optical launch power for a defined bit error rate, guaranteeing extinction ratio and absolute optimum operating power. The invention also includes the use of such a loop in achieving fast link initialization and dynamic optimization to compensate for all effects of time and temperature for all components within the link.

10 Claims, 3 Drawing Sheets

Illustration of the preferred embodiment

METHOD AND SYSTEM FOR CLOSED LOOP CONTROL OF AN OPTICAL LINK

BACKGROUND OF THE INVENTION

1. Field of the Invention

The present invention relates to a method for closed loop control of an optical link. The method provides a novel approach to the control of such a system through the use of a copper feedback link between the optical receiver and optical transmitter to directly define the laser diode threshold bias and modulation levels that are optimum for the link for a defined bit error rate, compensating for link losses and variations with respect to temperature, manufacture, aging, and other factors.

2. Description of Related Art

A typical optical link according to the prior art includes a laser driver, a laser diode (such as a fabry-perot diode or a VCSEL), an optical fiber, a photo diode and a trans-impedance amplifier. The laser driver switches current through the laser diode, which results in an optical emission from the laser diode. By aligning the laser diode and optical fiber, the laser diode emission is then channeled through the optical fiber, although some of the emission will be lost due to manufacturing limitations in the alignment of the laser diode and the optical fiber. At the other end of the fiber the photo diode receives the optical emission (with similar losses due to alignment here as well), which results in current flow through the photo diode. The photo diode is connected to the input of the trans-impedance amplifier, and the input current is realized back into a voltage signal at the output. Optical emission is generally referred to in units of power.

In addition to the alignment issues, optical links are subject to a variety of other factors that cause the emission power to vary, such as temperature, aging of the laser diode, etc. In the prior art, optical links have generally been used to span significant distances, on the order or meters or kilometers. Thus, the receiver and transmitter in an optical link have typically been connected only through an optical fiber that is used solely for forward communication. While there have been various attempts to compensate for some of the factors that cause variations in emission power in the design of the transmitter or receiver, feedback has generally been limited to a loop around only the transmitter, and not the entire system.

In one typical approach, the local mean emission power of the transmitter is measured with an external resistor or a monitor diode that is coupled to the laser diode. If the mean power is too low, the voltage to the laser diode is increased. This approach provides some compensation across both temperature and time-based degradation of the laser diode, but requires extra manufacturing costs to provide the resistor or monitor diode. Since this approach is not able to determine the exact threshold voltage of the laser diode, only the mean power may be used. Further, a margin must be added to the mean power measured to insure that the voltage provided to the laser diode is above the diode's threshold voltage, which tends to increase as the diode ages. In addition, the use of a resistor, or the coupling of the monitor diode to the laser diode, does not accurately represent the alignment of the laser diode and the optical fiber, and thus cannot well compensate for limitations in the accuracy of that alignment.

Alternatively, complete open loop control of the laser diode may be implemented. In one approach, analog techniques are used to model the laser diode characteristics with respect to temperature and current bias. However, this approach offers limited precision and is usually tuned to a specific laser diode, and thus impacts both overall performance and flexibility. Additionally, there is no compensation in this approach for aging of the laser diode.

Complete open loop control of the laser diode may also be implemented digitally by the use of a memory. The memory may be pre-programmed with a generic characteristic, or may be optimized during production on an individual unit basis. Pre-programming requires the attendant silicon and memory costs as well as sub-optimum performance due to diode manufacturing tolerances. Optimizing the memory results in improved performance, but at the expense of costly and complex programming requirements on the production line.

The receiver may also be designed in a particular way to compensate for some of the described problems. For example, the receiver may be designed to support a system-specified bit error rate criterion for its incoming signal. However, this requires allowing for both the smallest and largest possible current signal given the manufacturing tolerances, variations and operating conditions of the system, if such concerns are not dealt with by compensation techniques within the transmitter. In this approach, the constraints on a transmitter may be relaxed; for example, the transmitter may be allowed to have a larger variation in extinction ratio with temperature. But this relaxation comes at the cost of increasing receiver complexity, in this case increasing the receiver's operating dynamic range. Requiring operation of a receiver over a wide dynamic range is a significant design challenge, and greatly increases design complexity.

None of these approaches specifically compensate for losses due to alignment problems. To the extent that prior art solutions attempt to compensate for link loss due to alignment difficulties, they do so by fixed margins, representing an additional fixed power overhead.

Finally, optical links are becoming more common in small consumer devices such as cell phones, PDAs, etc. These devices present two particular problems. First, as it is desirable to keep the cost of the devices down, low cost, and thus low performance, components are typically used. To maximize the life span of these components, it is preferable that they be driven at the lowest levels possible, as hard driving of the components (at or near their upper limits, for example) will often shorten their life span. For example, the laser diode should be driven at a level as close to its threshold voltage as possible. Second, to extend the operating time of the devices per battery charge, it is preferable to keep the operating power to the minimum possible.

In the absence of any feedback between the receiver and transmitter certain challenges are thus presented in the design of the elements in an optical link system. It is therefore desirable to have a method of controlling an optical link that compensates for most or all of these issues and supports optimum power performance while requiring low operating power levels.

SUMMARY OF THE INVENTION

The present invention provides a method for closed loop control of an optical link which allows the determination of the exact threshold bias of a laser diode and a resulting ability to set the modulation levels applied to the laser diode above the threshold bias point guaranteeing the extinction ratio of the resulting launched optical signal regardless of the age of the diode, alignment losses, and other factors. The invention also allows the reliable application of the minimum drive and bias, thus conserving power dissipation and lowering the stress applied to the laser diode prolonging the life of the laser diode. This is accomplished by means of a feedback link between the receiver and the transmitter which is presented here as a copper interconnect, but could suitably be any form of medium dependant on the application.

This approach overcomes many of the design challenges discussed above, and offers an improvement in power dissipation and performance compared to the above mentioned methodologies. Such a closed loop inherently compensates for virtually all component characteristics, manufacturing tolerances and ageing. Additionally, while some prior art solutions attempt to compensate for link loss due to alignment difficulties by adding fixed margins, the present invention by contrast dynamically adjusts for such loss, and thus the additional fixed power overhead of the prior art is not required.

The costs of the approach of the present invention are largely dependant on the comparative cost of copper and fiber for a given application. Optical links have typically been used to cover distances of meters or kilometers, although more recent developments include the implementation of optical links in short range transmission, even as short as centimeters, in such mobile consumer goods as laptops, PDA's, mobile phones, etc. Implementation of a copper feedback link in the traditional meters-length environment is obviously more costly than in devices where lengths are measured in centimeters, making the present invention particularly economically suitable for short distance applications.

A further benefit of the use of a copper feedback link is lower power consumption. Traditional optical links competitively consume approximately 100 mw of power to function, while new mobile applications demand sub-20 mw performance. The ability to keep power dissipation to a minimum is essential in extending battery life, particularly in the mobile electronic devices mentioned.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
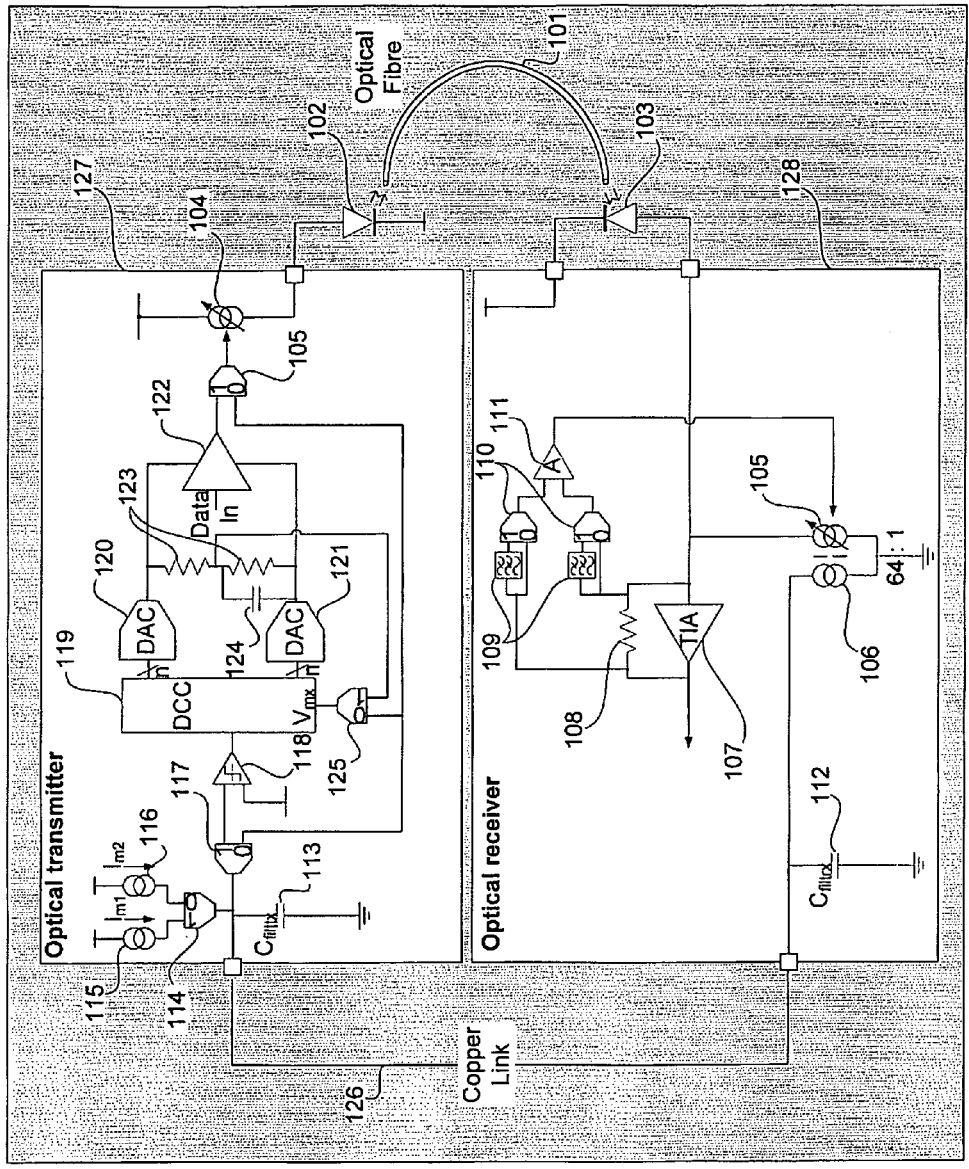
FIG. 1 is a block diagram illustrating an optical link system according to one embodiment of the invention.
Figure 2:
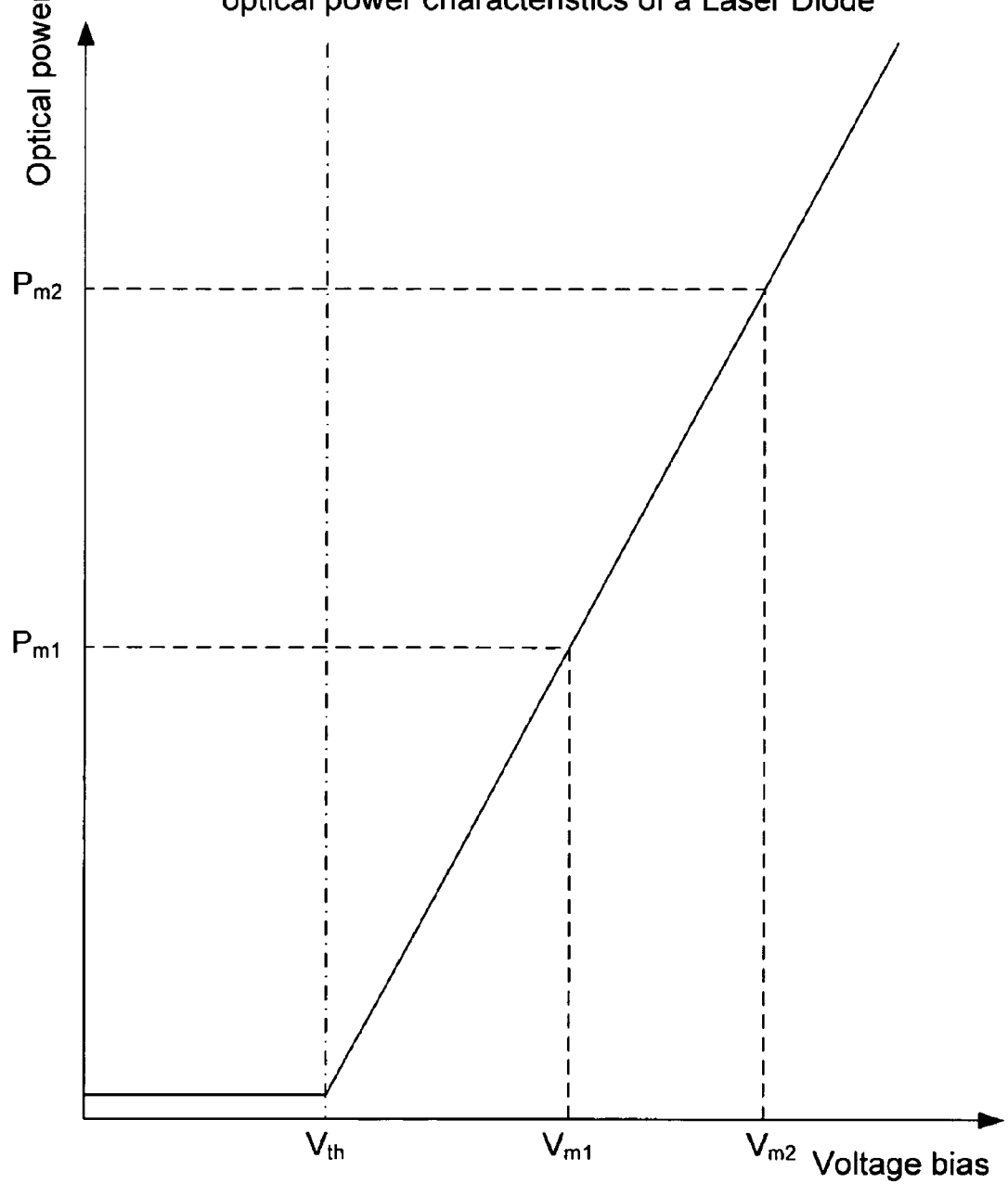
FIG. 2 is a graph showing a typical operating curve of a laser diode.

FIG. 2 is a graph showing a typical operating curve of a laser diode, such as a Vertical Cavity Surface Emitting Laser (VCSEL). Voltage bias is referred here to the control of the laser diode through a voltage controlled current source, illustrated by component, 104, in FIG. 1. This approach is used for ease of reference within this document.

Given measurements of mean received optical output power $P_{m1}$ and $P_{m2}$ that result from two mean voltages $V_{m1}$ and $V_{m2}$ respectively applied to the laser diode, the laser diode threshold voltage $V_{th}$, can be calculated directly as follows:

$$V_{th} = \frac{(P_{m2} - P_{m1})V_{m1} - (V_{m2} - V_{m1})P_{m1}}{(P_{m2} - P_{m1})} \quad \text{(Equation 1)}$$

Further assuming the received mean power levels may be designed in as a fixed ratio, for example:

$$\frac{P_{m2}}{P_{m1}} = 1.125$$

and setting $P_{m1}$ to 1 and applying this ratio to Equation 1, we may derive the following:

$$V_{th} = V_{m1} - 8(V_{m2} - V_{m1}) \quad \text{(Equation 2)}$$

Given a desired extinction ratio, k (expressed in linear terms), the high and low voltage levels $V0_{m1}$ and $V1_{m1}$, respectively, needed to produce the desired received mean power $P_{m1}$ can be shown to be:

$$V0_{m1} = V_{th} + \frac{2(V_{m1} - V_{th})}{1+k} \quad \text{(Equation 3)}$$

$$V1_{m1} = V_{th} + \frac{2k(V_{m1} - V_{th})}{1+k} \quad \text{(Equation 4)}$$

Similarly, for the desired received mean power $P_{m2}$:

$$V0_{m2} = V_{th} + \frac{2(V_{m2} - V_{th})}{1+k} \quad \text{(Equation 5)}$$

$$V1_{m2} = V_{th} + \frac{2k(V_{m2} - V_{th})}{1+k} \quad \text{(Equation 6)}$$

FIG. 1 shows a system according to one embodiment of the present invention. An optical transmitter 127 drives a laser diode 102, such as a VCSEL, which in turn sends an optical signal down optical fiber 101. A photo diode 103 receives the optical signal and provides a current proportional to the received power into the optical receiver 128, which converts it back to an electrical signal to recover the input signal to transmitter 127. A feed back link 126 provides a signal back from receiver 128 to transmitter 127. Feed back link 126 is presented here as copper, although other materials may be used.

The signal fed back to transmitter 127 from receiver 128 though feed back link 126 is preferably a measure of the mean received power in the receiver 128. This measure may be in either an analog or digital representation; an implementation using an analog measure is described herein. Through the use of this feed back the received mean power may be compared to a predetermined desired level which is designed into the system and kept within a desired range.

In the illustrated system of FIG. 1, the mean received power is fed back in the form of a current mirrored from a direct current restore loop (DCR) contained in the receiver 128. This mean received current is compared to the reference currents $I_{m1}$ and $I_{m2}$, provided by current sources 115 and 116 respectively, as discussed below.

Reference will now be made in detail to the present described embodiment of the invention, an example of which is illustrated in the accompanying figures. It is assumed that the transmitter 127 contains a processor 119, such as a digital processor or microprocessor, which is capable of performing the calculations defined by equations 2 through 6 above.

In the illustrated embodiment, the invention has two modes of operation, static calibration and dynamic calibration. During these calibration operations the threshold of the laser diode 102 is measured.

Before explaining the calibration functions it is first appropriate to explain two circuit functions used within the described implementation. The first function is the direct current restore loop implemented in the optical receiver 128. As previously mentioned this is a function commonly implemented in optical receivers. The second function is a current integrator used for comparing the feedback current from the optical receiver 128, using the copper link 126 to the optical transmitter 127 with the reference currents 115 and 116 as selected using the multiplexor (mux) 114.

The direct current (DC) restore loop is implemented using amplifier 111, which monitors the voltage across the trans-impedance resistor 108. In the absence of a DC restore loop the incoming current signal would result in an AC coupled voltage signal around 0V at the output of the trans-impedance amplifier (TIA) 107. A voltage signal of these characteristics is not useful for the subsequent circuits. As such the DC restore loop sinks a DC current at the input of the TIA 107 using the variable current source 105, until the DC voltage across the resistor 108 is zero. Thus, when this loop is settled the resultant current flowing through 105 is equal to the mean current. For traditional applications using optical receivers it is advantageous for the DC restore loop to operate at a very low frequency in order to keep low frequency jitter—commonly known as base line wander—to an acceptable level. The low frequency function of this loop is represented by the low pass filters 109.

With respect to the current integrator, during closed loop control a current $I_{fb}$ is fed back on the copper link 126 using the current source 106, which is a scaled copied version of current source 105. Therefore the feedback current is proportional to the mean received current at the input of the optical receiver 128. This feedback current is in turn summed with the reference currents 115 or 116 depending on the selection of the mux 114. Any mismatch between the feed back current and the selected reference current is integrated by the capacitor 113 into a voltage which may be used to control the drive current provided by current source 104 either through the digital loop or direct analog control loop as explained in the following sections.

For static calibration this is achieved by first setting the multiplexors 105, 110, 117 and 125 to position '0'. This forms an analog closed loop. Given that there is no data present during this calibration sequence, but only DC levels, the DC restore filters 109 maybe switched out by setting MUX 110 to the '0' position. This allows the DC restore loop to settle quickly, supporting a fast calibration time. The sources for current references $I_{m1}$ and $I_{m2}$, 115 and 116 respectively, are alternately selected using multiplexor 114. After a given settling period which is dependant upon the designed loop characteristics, the respective voltages $V_{m1}$ and $V_{m2}$ are measured directly from the voltage present at the input to the voltage controlled current source 104.

Adopting an analog loop offers very fast measurement of the voltages $V_{m1}$ and $V_{m2}$, dependant only upon the designed loop settling time, and thus is appropriate for fast link initialization. A digitally operated system with speeds comparable to those that may be achieved with this configuration would have much larger area, power overheads and require high speed clocks on what can be a highly noise sensitive integrated chip.

Having measured and recorded $V_{m1}$ and $V_{m2}$, the processor 119 may, by using equations 3 and 4, calculate both the exact value of $V_{th}$ and the modulation voltages $V0_{m1}$ and $V1_{m1}$ that are required to keep the output power within a desired range of operation that corresponds to a desired bit error rate. The values of these voltages are then stored, and the system is then prepared to transmit data. To transmit data, the multiplexors 105, 110, 117 and 125 are set in position '1'.

In the illustrated embodiment, the values of voltages $V0_{m1}$ and $V1_{m1}$ are stored in registers in the control DACs 120 and 121. In an alternative embodiment, the voltages $V0_{m1}$ and $V1_{m1}$ may be stored on capacitors; however, in this embodiment, the voltage values must be updated periodically since capacitors will leak over time and the capacitive stored voltage values will drop. While the control DACs 120 and 121 have the advantage that they do not leak and thus the stored values of $V0_{m1}$ and $V1_{m1}$ do not change, they are more complex and require more layout area than a capacitor-based solution.

Once the system has been calibrated in the static fashion and is operating as described above, there may be a need to recalibrate to compensate for any changes in the link characteristics. The most likely reasons that this may be necessary are for temperature changes and aging of the laser diode, with temperature being the primary focus given the relatively short bursts of data versus the timeframes of component aging. It is desirable to perform recalibration without interrupting data transmission to allow for a static calibration. This type of calibration is referred to here as dynamic calibration.

In essence, this is done by shifting the DC portion of the laser diode drive current delivered by the voltage controlled current source 104 between two reference points, ultimately defined by the current references 115 and 116, allowing the new points on the curve, as shown in FIG. 2, to be determined. The receiver has an inherent low pass characteristic by virtue of the DC restore loop, so that the DC shift may be controlled to be slow enough that any effects are removed from the data signal forward of the TIA 107. As for the static calibration, the feedback current $I_{fb}$ represents the DC level of the incoming signal at the input to the receiver 128 allowing the DCC to record two new values and the slope of the laser diode's voltage bias to be recalculated.

Upon initially beginning a dynamic calibration it is likely that a small error exists between the mean received photo current and the reference current $I_m$ due to changes in the laser diode threshold since the prior calibration. This error must therefore be trimmed out by adjusting the register values in DACs 120 and 121 as discussed above before measuring $V_m$.

Once trimming has been carried out multiplexors 105, 110, 117 and 125 are again set in position '1', forming a digital closed loop. The levels $V_{m1}$ and $V_{m2}$ may now be measured from the output of the control DACs 120 and 121, using the filtered resistive divider comprised of resistors 123 and capacitor 124.

Dynamic calibration starts with the assumption that the last calculated $V_{th}$ is a reasonable approximation of the present $V_{th}$. Using equations 5 and 6 the processor 119 calculates the required laser diode modulation levels $V0_{m2}$ and $V1_{m2}$ which will yield a mean received power substantially equal to $P_{m2}$, which corresponds to a drive current of $I_{m2}$ from current source 116. The register values of control DACs 120 and 121 are slowly adjusted until they match $V0_{m2}$ and $V1_{m2}$. These values are respectively the minimum and maximum swing levels, and thus moving them at the same rate maintains the voltage swing applied to current source 104 while varying the DC level.

In the receiver 128, a voltage will appear across resistor 108 due to the change in DC level applied by DACs 120 and 121. Low pass filters 109 pass the low frequency, i.e., DC, component of this signal, and the DC restore function will reduce this resultant DC voltage to zero by increasing the current from current source 105.

The result is that an average current flows through current source 105 and is then mirrored in current source 106 and fed back to the transmitter as above. As before, any error between the feedback current and the reference current is integrated on capacitor 113.

If the voltage on capacitor 113 is too high, i.e., the reference current $I_{m1}$ is higher than the feedback current $I_{fb}$, then the processor 119 increases the average current to provide more power to the laser diode, resulting in more light to the receiver, more restored current, and therefore more feedback current until the voltage on capacitor 113 drops. The opposite will occur if the voltage on capacitor 113 is too low.

The change in the variation of this DC level by the transmitter 127 during dynamic calibration is preferably kept to a minimum to save power and limit the DC restore that must be performed by the receiver 128; however, this in turn increases the need for accuracy in the ability of the receiver to remove the DC signal. One of skill in the art will appreciate the tradeoff necessary to select a compromise between power consumption in the transmitter and accuracy in the receiver.

By alternating between the current source references 115 and 116, two points on a curve are again obtained for the updated values of $V_{m1}$ and $V_{m2}$; these may be used in equation 1 to calculate an updated value for $V_{th}$ and, using this in equations 3 and 4 the processor 119 may again calculate the required laser modulation levels $V0_{m1}$ and $V1_{m1}$ which will yield a mean received power substantially equal to $P_{m1}$ as defined by current $I_{m1}$ from current source 115. The register values in the control DACs 120 and 121 are then slowly adjusted until they match the newly calculated values for $V0_{m1}$ and $V1_{m1}$.

Three main factors can materially affect the calculated $V_{th}$ value: temperature change, laser diode ageing effects, or fiber displacement. Temperature change is detected by periodically measuring temperature and comparing it with the recorded temperature at the last calibration, and providing an indication that a maximum allowable temperature deviation, $T_{delmax}$, has been exceeded, by, for example, the setting of a flag. The ageing effect is dealt with by a simple timer which is set for an appropriate long period $t_{delmax}$. Fiber displacement can be handled by detecting a gross change in the feedback current and generating an interrupt to force a recalibration. A flag from any of these would then result in a dynamic calibration.

Figure 3:
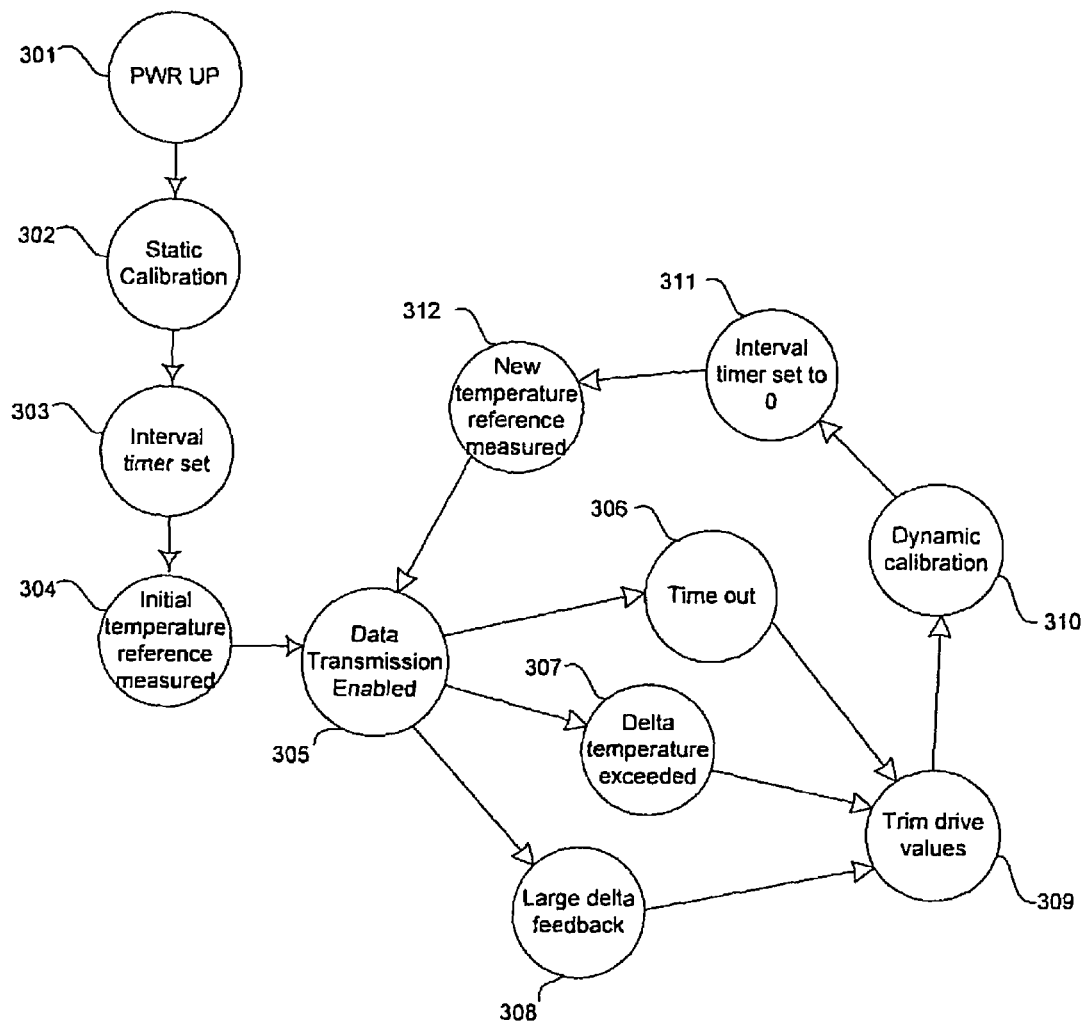
FIG. 3 is a flow chart showing a method of operating an optical link system according to one embodiment of the invention.

Thus, as shown in FIG. 3, the operation of an optical link system according to one embodiment of the invention includes the following steps:

At step 301, power is provided to the system. At step 302, static calibration is performed as described above. At step 303 a calibration interval timer is started, and the initial temperature is measured at step 304. Next, the transmitter begins signal modulation at step 305. In the preferred application there are three triggers for a dynamic calibration; whether an interval timer exceeds a predetermined period, step 306, or a defined delta temperature is exceeded, step 307, or a large change in feedback current, step 308. If any of these conditions are detected then the drive values are trimmed at step 309, followed by a dynamic calibration at step 310. Upon the completion of a dynamic calibration the interval timer is set to 0 at step 311, and a new temperature reference measure is made and stored for future comparison at step 312.

It will be seen that the present invention may have a number of desirable effects. Use of the invention can result in a minimum consumption of power, as the launch power may be controlled to be sufficient for a specified bit error rate but no more. Similarly, optimum longevity of the laser diode may be obtained, as the laser diode is run at the lowest possible power level to achieve the specified bit error rate.

The link is self-monitoring, providing improvement on link losses and a corresponding reduction in power consumption. Additionally, the bit error rate is guaranteed by a well controlled and accurate signal to noise ratio. The system inherently compensates for temperature effects on every component in the system, as well as for laser diode degradation over its life time.

Use of the present invention may also result in reduced silicon area by obviating the requirement for non-volatile memory and associated I2C hardware utilized in open loop driver control. Finally, the requirement for costly in-circuit programming operation is completely avoided.

The invention has been explained above with reference to several embodiments. Other embodiments will be apparent to those skilled in the art in light of this disclosure. The present invention may readily be implemented using configurations other than those described in the embodiments above, or in conjunction with systems other than the embodiments described above.

For example, in place of a copper link, any communication means may be used to carry the feedback signal, including, for example, a radio or optical connection, etc. In place of a digital processor, an analog controller could also be implemented. In place of an optical fiber any form of optical transmission medium may easily be substituted. Finally, where the terms laser diode and photo diode are used it is accepted that any form of optical emitter and optical detector could be readily substituted. For example, instead of a fabry-perot laser diode a VCSEL could easily be utilized.

These and other variations upon the embodiments are intended to be covered by the present invention, which is limited only by the appended claims.

The invention claimed is:

1. A system for providing closed loop control of an optical link, comprising:
    a transmitter for generating an optical signal;
    an optical fiber for transmitting the optical signal, having a first end for receiving the optical signal from the transmitter and a second end for outputting the optical signal;
    a receiver for receiving the optical signal from the second end of the optical fiber;
    a sensor for measuring the mean power of the optical signal received by the receiver for a predetermined desired level of the optical signal generated by the transmitter;
    feedback means for providing a signal from the receiver to the transmitter in the form of a current which is proportional to the mean power of the optical signal received at the input of the receiver after transmission by the optical fiber;
    a comparator for comparing the mean power of the signal received by the receiver to the predetermined desired level of the optical signal transmitted by the transmitter; and
    a controller for determining the threshold voltage of the laser diode and the modulation levels to be applied to the laser diode such that the extinction ratio and signal swing of the launched power signal result in a received signal to noise ratio within the receiver which achieves a predetermined bit error rate.

2. The system of claim 1, wherein the feedback means comprises a copper interconnect from the receiver to the transmitter.

3. A method for determining the transfer function of an optical link having a transmitter including a laser diode which generates an optical signal and a receiver which receives the optical signal, comprising:

measuring the mean power of the optical signal received by the receiver for a plurality of predetermined desired levels of the optical signal generated by the laser diode;

providing a feedback signal from the receiver to the transmitter in the form of a current which is proportional to the mean power of the optical signal received by the receiver;

comparing the mean power of the signal received by the receiver to the plurality of predetermined desired levels of the optical signal; and determining the threshold of the laser diode and the modulation levels to be applied to the laser diode such that the Extinction Ratio and signal swing of the launched power signal result in a received signal to noise ratio within the receiver which achieves a predetermined Bit Error Rate.

4. The method of claim 3, wherein comparing the mean power of the signal received by the receiver to the plurality of predetermined desired levels of the optical signal comprises:

feeding back a current from the receiver which is proportional to the current received at the input of the receiver; and comparing the current fed back from the receiver to a plurality of reference currents which are proportional to the desired levels of the optical signal.

5. A method of operating an optical link having a transmitter including a laser diode which generates an optical signal and a receiver which receives the optical signal, comprising:

performing a calibration of the optical link with no data signal present; and determining the transfer function of the optical link by:

measuring the mean power of the optical signal received by the receiver for a plurality of predetermined desired levels of the optical signal generated by the laser diode;

providing a feedback signal from the receiver to the transmitter in the form of a current which is proportional to the mean power of the optical signal received by the receiver;

comparing the mean power of the signal received by the receiver to the plurality of predetermined desired levels of the optical signal; and determining the threshold of the laser diode and the modulation levels to be applied to the laser diode such that the Extinction Ratio and signal swing of the launched power signal result in a received signal to noise ratio within the receiver which achieves a predetermined Bit Error Rate.

6. The method of claim 5, wherein performing a calibration of the optical link with no data signal present further comprises forming an analog closed loop of direct current levels.

7. The method of claim 5, wherein comparing the mean power of the signal received by the receiver to the plurality of predetermined desired levels of the optical signal comprises:

feeding back a current from the receiver which is proportional to the current received at the input of the receiver; and comparing the current fed back from the receiver to a plurality of reference currents which are proportional to the desired levels of the optical signal.

8. The method of claim 7, wherein the level of the optical signal is determined by a drive voltage applied to the laser diode, and further comprising performing an additional calibration with a data signal present by:

trimming any differences between the current fed back from the receiver and the plurality of reference currents;

slowly shifting the level of the optical signal by increasing the drive voltage of the laser diode from a first level corresponding to a minimum desired level of the optical signal to a second level corresponding to a maximum desired level of the optical signal;

comparing the current fed back from the receiver to the first one and second one of the plurality of reference currents; and if necessary, adjusting the first one and second one of the plurality of reference currents to correspond to the minimum and maximum desired levels of the optical signal.

9. The system of claim 1, wherein the feedback current is mirrored from a direct current restore loop contained in the receiver.

10. The system of claim 9, wherein the direct current restore loop is operated at a very low frequency to minimize low frequency jitter.

* * * * *